(12) United States Patent
Eriksen et al.

(10) Patent No.: US 9,932,969 B2
(45) Date of Patent: Apr. 3, 2018

(54) AIR-GAP SECURE SYSTEM FOR A WIND TURBINE

(71) Applicant: SIEMENS AKTIENGESELLSCHAFT, München (DE)

(72) Inventors: Uffe Eriksen, Horsens (DK); Claus Johansen, Sønderborg (DK); Jens Anton Agerskov Veng, Ikast (DK)

(73) Assignee: SIEMENS AKTIENGESELLSCHAFT (DE)

( * ) Notice: Subject to any disclaimer, the term of this patent is extended or adjusted under 35 U.S.C. 154(b) by 32 days.

(21) Appl. No.: 15/138,282

(22) Filed: Apr. 26, 2016

(65) Prior Publication Data
US 2016/0237991 A1 Aug. 18, 2016

Related U.S. Application Data

(63) Continuation of application No. 14/096,384, filed on Dec. 4, 2013, now Pat. No. 9,382,899.

(30) Foreign Application Priority Data

Dec. 18, 2012 (EP) ..................................... 12197853

(51) Int. Cl.
*F03D 9/00* (2016.01)
*H02P 9/04* (2006.01)
(Continued)

(52) U.S. Cl.
CPC ............. *F03D 80/70* (2016.05); *F03D 1/065* (2013.01); *F03D 7/0248* (2013.01); *F03D 9/25* (2016.05);
(Continued)

(58) Field of Classification Search
CPC ..... F03D 9/002; F03D 7/0247; F03D 11/0008
(Continued)

(56) References Cited

U.S. PATENT DOCUMENTS 5,306,678 A 4/1994 Yoshida et al.
7,431,567 B1 10/2008 Bevington et al.
(Continued)

FOREIGN PATENT DOCUMENTS

FR 2924285 5/2009

OTHER PUBLICATIONS

Machine translation of FR 2924285.*
(Continued)

*Primary Examiner* — Tulsidas C Patel
*Assistant Examiner* — Thomas Quigley
(74) *Attorney, Agent, or Firm* — Schmeiser Olsen & Watts LLP

(57) ABSTRACT

Disclosed is a wind turbine, which comprises a rotatable structure being coupled to a hub of the wind turbine and to a generator rotor comprising a brake disc, a stationary structure being coupled to a generator stator and comprising a stator frame and a safety bearing element. The rotatable structure is rotatably coupled to the stationary structure, wherein the stator frame comprises a brake mounting section to which a calliper brake is mountable such that the brake disc is breakable by the mounted calliper brake. The safety bearing element is mounted to the brake mounting section such that the brake disc is in slidable contact with the safety bearing element if a distance between the brake mounting section and the brake disc is reduced below a predetermined reference value.

14 Claims, 3 Drawing Sheets

(51) Int. Cl.
- *F03D 80/70* (2016.01)
- *F03D 7/02* (2006.01)
- *H02K 7/08* (2006.01)
- *H02K 7/18* (2006.01)
- *H02K 11/20* (2016.01)
- *F03D 9/25* (2016.01)
- *F03D 1/06* (2006.01)
- *H02K 7/10* (2006.01)
- *H02K 7/102* (2006.01)

(52) U.S. Cl.
CPC .......... *H02K 7/088* (2013.01); *H02K 7/1838* (2013.01); *H02K 11/20* (2016.01); *F05B 2220/706* (2013.01); *H02K 7/10* (2013.01); *H02K 7/102* (2013.01); *H02K 2213/06* (2013.01); *Y02E 10/721* (2013.01); *Y02E 10/722* (2013.01); *Y02E 10/723* (2013.01); *Y02E 10/725* (2013.01)

(58) Field of Classification Search
USPC .................................................. 290/44, 55
See application file for complete search history.

(56) References Cited

U.S. PATENT DOCUMENTS

| | | |
|---|---|---|
| 7,944,074 B2 | 5/2011 | Longtin et al. |
| 8,358,028 B2 | 1/2013 | Stiesdal |
| 2011/0121579 A1 | 5/2011 | Eriksen |
| 2013/0214628 A1 | 8/2013 | Le Flern et al. |
| 2013/0292948 A1 | 11/2013 | Pallotti et al. |

OTHER PUBLICATIONS

Office Action (dated Jul. 6, 2015) for U.S. Appl. No. 14/096,384, filed Dec. 4, 2013.
Final Office Action (dated Dec. 22, 2015) for U.S. Appl. No. 14/096,384, filed Dec. 4, 2013.
European Search Report (EPO) Application No. EP12197853, dated Sep. 25, 2013; Siemens Aktiengesellschaft.
Notice of Allowance (dated Mar. 7, 2016) for U.S. Appl. No. 14/096,384, filed Dec. 4, 2013.

\* cited by examiner

AIR-GAP SECURE SYSTEM FOR A WIND TURBINE

CROSS-REFERENCE TO RELATED APPLICATIONS

This application is a continuation application of and claims priority from co-pending U.S. patent application Ser. No. 14/096,384 filed Dec. 4, 2013, which claims the benefit of and priority to EP 12197853, filed Dec. 18, 2012 under 35 U.S.C. § 119, the entire contents of which are hereby incorporated by reference.

FIELD OF TECHNOLOGY

The following relates to a wind turbine comprising a safety bearing element and a method for operating a wind turbine with a safety bearing element.

BACKGROUND

In general, a wind turbine comprises a hub to which the rotor blades are mounted. The hub is mounted to a rotatable structure of the wind turbine. The rotatable structure rotates around a stator of the wind turbine, wherein the stator is mounted inside a nacelle of the wind turbine. In some embodiments of wind turbines, gear devices are installed to transfer the drive torque induced by the hub to a generator rotor inside a nacelle of the wind turbine.

In other wind turbine embodiments, the so-called direct drive wind turbine design is applied. In a direct drive wind turbine design, no gear devices are used. The drive torque is directly transferred from the hub to the rotatable structure which is directly coupled to a generator rotor of the wind turbine. Hence, in the direct drive wind turbine design, large diameters of the rotatable structure and respective stator parts of stationary structures of the wind turbine, in particular inside the generator, exist.

When a generator rotor of a large direct drive wind turbine is rotating and there occurs heavy shifting loads, e.g. due to wind gusts, large turbulences and/or if a bearing of the generator of the wind turbine is damaged, then it is important to ensure that there is kept at least a small air gap between the rotatable structure and the stationary structure of the generator. Otherwise, there is a risk that e.g. the generator may be damaged.

U.S. Pat. No. 7,944,074 B discloses a wind turbine generator which comprises a stator arranged about an axis and a rotor which is mounted with respect to the stator to generate electricity. The rotor is rotatably communicating with the wind turbine blades rotating substantially about the axis. The rotor and the stator are configured to maintain an air gap there between. The stator and the rotor have selectively engageable surfaces close to the hub of the wind turbine in order to assure a rotation between the rotor and the stator. The engageable surfaces are located along an axis in the region of ball bearings or roller bearings. In the region where the hub is mounted to the rotor, the accessibility is very difficult in order to maintain the bearings and the engageable surfaces, respectively.

SUMMARY

An advantage of the following is to provide a wind turbine with a safety bearing which is simple to maintain.

The advantage may be addressed by a wind turbine and a method of operating the wind turbine according to the independent claims.

According to a first aspect of the present invention, a wind turbine is presented which comprises a rotatable structure being coupled to a hub of the wind turbine and to a generator rotor, a stationary structure being coupled to a generator stator and comprising a stator frame (bed frame) and a safety bearing element. The rotatable structure comprises a stiffening disc, such as a brake disc. The rotatable structure is rotatably coupled to the stationary structure.

The safety bearing element is mounted to the stator frame such that the stiffening disc is in slidable contact with the safety bearing element if a distance between the stator frame and the stiffening disc is reduced below a predetermined reference value.

In an exemplary embodiment, the stator frame comprises a brake mounting section to which a caliper brake is mountable such that the stiffening disc, such as a brake disc, is breakable by mounted caliper brakes. The safety bearing element is mounted to a brake mounting section of the stator frame such that the brake disc is in slidable contact with the safety bearing element if a distance between the mounting section and the brake disc is reduced below a predetermined reference value.

According to a further aspect of the present invention, a method for operating a wind turbine is presented. According to the operating method, a rotatable structure is rotated relative to a stator frame of a stationary structure. A hub with blades is capable to the rotatable structure, wherein the rotatable structure comprises a brake disc. The stator frame comprises a brake mounting section to which a caliper brake is mountable such that the brake disc is breakable by the mounted caliper brake. A safety bearing element is mounted to the brake mounting section such that the brake disc is in slidable contact with the safety bearing element if a distance between the mounting section and the brake disc is reduced below a predetermined reference value.

The wind force attacks the blades of the wind turbine such that the hub rotates around a rotating axis and generates a drive torque. The hub is coupled to the rotatable structure of the wind turbine, wherein the rotatable structure is rotatably coupled to a stationary structure; such a stator frames, of the wind turbine. The rotatable structure comprises a coupling section to which the hub is coupled. Furthermore, the rotatable structure is coupled to a generator rotor indirectly via a gearbox or directly via a direct coupling (i.e. as used in a direct drive wind turbine design). In regular operation, the rotatable structure is coupled to the stationary structure e.g. by roller or ball bearings, wherein besides the roller or ball bearings an air gap is formed between the rotational and stationary parts.

The stationary structure is fixed to the wind turbine structure, such as a nacelle or a tower section of the wind turbine. The weight force of the blades, the hub and the rotatable structure is transferred by the stationary structure to the wind turbine structure, such as the wind turbine tower or the nacelle. In a direct drive wind turbine design, the stationary structure forms also part of the generator stator of the wind turbine. The stationary structure comprises the stator frame which comprises a circular profile and a centre axis which may be coaxial to a rotational axis of the rotatable structure.

The rotatable structure comprises at a first axial end the coupling section to the hub. In particular at an opposed end along the rotational axis of the rotatable structure, the rotatable structure comprises a brake disc. Accordingly, the stationary structure comprises at an end section which is an end section of the stationary structure inside the nacelle, a stator frame (e.g. a so-called bed frame) to which a caliper brake is mounted at a brake mounting section of the stator frame. The caliper brake envelopes partially the brake disc of the rotatable structure such that by activating the caliper brake, a brake force is applied to the rotatable structure for braking the rotation of the rotatable structure.

The stiffening disc, such as the brake disc, and the stator frame are located within the nacelle and in particular at respective inner axial end sections of the rotatable structure and the stationary structure, respectively, so that a simple and comfortable accessibility is provided for maintenance purposes. The rotor structure may need a stiffening plate at the far end, i.e. the inner axial end sections of the rotatable structure and/or the stationary structure. In this case the stiffening plate serves to limit the deflections of the rotor structure.

In particular, the brake disc and the caliper brake have to be maintained in order to exchange worn out parts. Hence, in common wind turbine designs, the brake disc and the stator frame are already design for providing a proper accessibility in order to exchange worn out parts easily.

In particular, if the safety bearing element is mounted to the stator frame (i.e. the bed frame), the safety bearing element is located spaced apart along the centre axis from the main (roller) bearings between the rotatable structure and the stationary structure, because the main bearings are typically located close to the hub of the wind turbine. Hence, if wind gusts or other loads act at the blades, a high moment acts at the region of the brake mounting section and the brake disc because the brake disc and stator frame with the brake mounting section have a large lever arm to the roller bearings. Hence, it may happen that e.g. during wind gusts, a high bending moment acts to the rotatable structure and/or to the stationary structure such that the distance between the brake mounting section and the brake disc is temporarily reduced below the predetermined reference value. Hence, it is beneficial to apply in the region of the brake mounting section and the brake disc the safety bearing element in order to provide a temporary emergency operation until the turbulences or wind gusts are reduced again.

The safety bearing element may be formed of a rigid material block. A material of the safety bearing element may comprise proper sliding properties such that a sliding contact bearing between the brake disc and the safety bearing element is achieved. Furthermore, the safety bearing element comprises a contact surface, wherein the contact surface is the surface which is in contact with the brake disc if the distance between the mounting section and the brake disc is reduced below the predetermined reference value. The contact surface may comprise a surface profile and surface shape which are aligned to the corresponding brake disc contact surface.

Between the stationary structure and rotatable structure, and in particular between the brake mounting section and the brake disc, an air gap is provided, in particular an air gap along a radial direction.

An axial direction describes in the following a direction along the centre axis of the stator frame and the stationary structure, respectively, and/or a direction along the rotational axis of the rotatable structure. A radial direction describes a direction which runs through the centre axis/rotational axis and which is perpendicular to the centre axis/rotational axis. A circumferential direction describes a direction around the circumference around the centre axis/rotational axis. The radial direction is perpendicular to the circumferential direction and the axial direction.

If the radial size of the air gap and hence if the distance (e.g. the radial distance) between the brake mounting section and the brake disc is reduced below a predetermined reference value, the safety bearing element gets in sliding contact with the brake disc, such that the safety bearing element forms a sliding bearing between the brake disc (i.e. the rotatable structure) and the stator frame (i.e. the stationary structure). Hence, if the air gap is reduced e.g. due to wind gusts, large turbulences and/or bearing defects, an emergency operation of the wind turbine is still provided by the sliding bearing.

Hence, by the approach of the present invention, the safety bearing element is installed in the region of the brake mounting section. Hence, also a proper accessibility to the safety bearing element is given, so that a better accessibility to the safety bearing element is also given for maintenance reasons.

According to a further exemplary embodiment, the brake disc surrounds the stator frame of the stationary structure. In other words, the brake disc comprises an inner opening, into which the stator frame is locatable. In other words, the brake disc and hence the rotatable structure is an external rotatable structure with respect to the internal, inner stator frame and stationary structure, respectively.

According to a further exemplary embodiment, the safety bearing element is mounted to the brake mounting section such that a radially outer contact surface of the safety bearing element is in slidable contact with a radially inner surface of the brake disc.

According to a further exemplary embodiment, the safety bearing element comprises an indicating device, wherein the indicating device indicates a slidable contact with the safety bearing element. For example, the indicating device comprises a wire which is incorporated into the safety bearing element. In particular, the wire is at least partially located at the contact surface of the safety bearing element with the brake disc such that if a contact between the contact surface and the brake disc occurs, a current flow (due to the sliding contact) through the wire may be detected. This detected current flow is indicative of a contact signal. The indicating device may also comprise a sensor, such as an optical sensor, in order to detect the gap size or a contact between the safety bearing element and the brake disc. The indicating device may be connected to a respective control unit of the wind turbine such that further steps, such as an emergency stop of the wind turbine, may be initiated by the control unit.

In a further exemplary embodiment, the wire may run through the body of the safety bearing element. The wire is then exposed to the contact surface if a certain amount of abrasion has already been occurred to the safety bearing element. Hence, the wire may be used as an abrasion indicator of the safety bearing element. For example, if the abrasion indicator wire contacts the brake disc due a certain amount of abrasion of the safety bearing element, a signal is given to the indicating device and hence to the control unit that a certain amount of abrasion exists so that for example the safety bearing element has to be exchanged.

According to a further exemplary embodiment, the safety bearing element is mounted to the brake mounting section in a detachable manner. For example, detachable fixing elements, such as screw and bolt connections, may be applied in order to accomplish the detachable mounting of the safety bearing element to the brake mounting section. Hence, a proper maintenance is achieved.

According to a further exemplary embodiment, the safety bearing element is formed of a material which is softer than the material of the brake disc material. Hence, the abrasion occurs exclusively at the safety bearing element which is easy to exchange. In this way, the safety bearing element is worn down instead of the brake disc if they slide against each other, e.g. during high loads or bearing failures. Hence, proper maintenance properties of the wind turbine are achieved.

According to a further exemplary embodiment, the wind turbine further comprises a further safety bearing element wherein the stator frame comprises a further brake mounting section to which a further caliper brake is mountable such that the brake disc is breakable by the further caliper brake. The brake mounting section and the further brake mounting section are spaced apart along a circumferential direction of the stator frame. The further safety bearing element is mounted to the further brake mounting section such that the brake disc is in slidable contact with the safety bearing element if a further distance between the further mounting section and the brake disc is reduced below a further predetermined reference value.

By the above-described exemplary embodiment it is outlined that along the circumferential direction of the stator frame a plurality of further brake mounting sections are formed to the stator frame, wherein to one, a couple or to all of the brake mounting sections respective safety bearing elements may be attached.

According to a further exemplary embodiment, the wind turbine further comprises a rotatable structure locking device which is mounted to the brake mounting section. The rotatable structure locking device is selectively fixable to the brake disc for locking the rotatable structure device.

Summarizing, by the present invention, in particular a direct driven wind turbine comprises a safety bearing element (air gap securing means) which comprises a contact surface, i.e. an end surface, which radially faces a respective surface part of the brake disc which is connected to a rotatable structure of a (i.e. direct driven) generator of the wind turbine.

The safety bearing element may be detachably attached to a brake mounting section of the stator frame. To the brake mounting section, a bracket, in particular a caliper brake, may be additionally attached.

By the invention, a contact surface of the safety bearing element may slide against an inner circular surface part of the brake disc and thereby support the rotatable structure (e.g. of a direct driven) generator if the air gap (distance) between the rotatable structure and the stationary structure of the generator is below a certain safety gap (predetermined reference value).

By the present invention, it is easier to get access to the safety bearing element from the inside of a nacelle of the wind turbine for exchanging purposes or other kind of service of the safety bearing element.

An indicating device with an electrical wire may be built or cast into or attached to one or to a plurality of the safety bearing elements, so that if the electrical wire breaks due to wear or abrasion of the safety bearing element, a signal is generated such that the wind turbine may be stopped by e.g. a wind turbine controller (control unit). The (electrical) wire may be put into a milled notch on the sliding surface (contact surface) of the safety bearing element. The safety bearing element may further comprise a plurality of through-holes for bolt connections in order to provide a detachable connection between the safety bearing element and the brake mounting section.

Summarizing, by the present embodiments, a direct drive wind turbine with air gap securing means (a safety bearing element) is provided, wherein the safety bearing element comprises an end surface (contact surface) facing a (radially inner) surface part of the brake disc which is connected to a rotatable structure of a (direct driven) generator.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
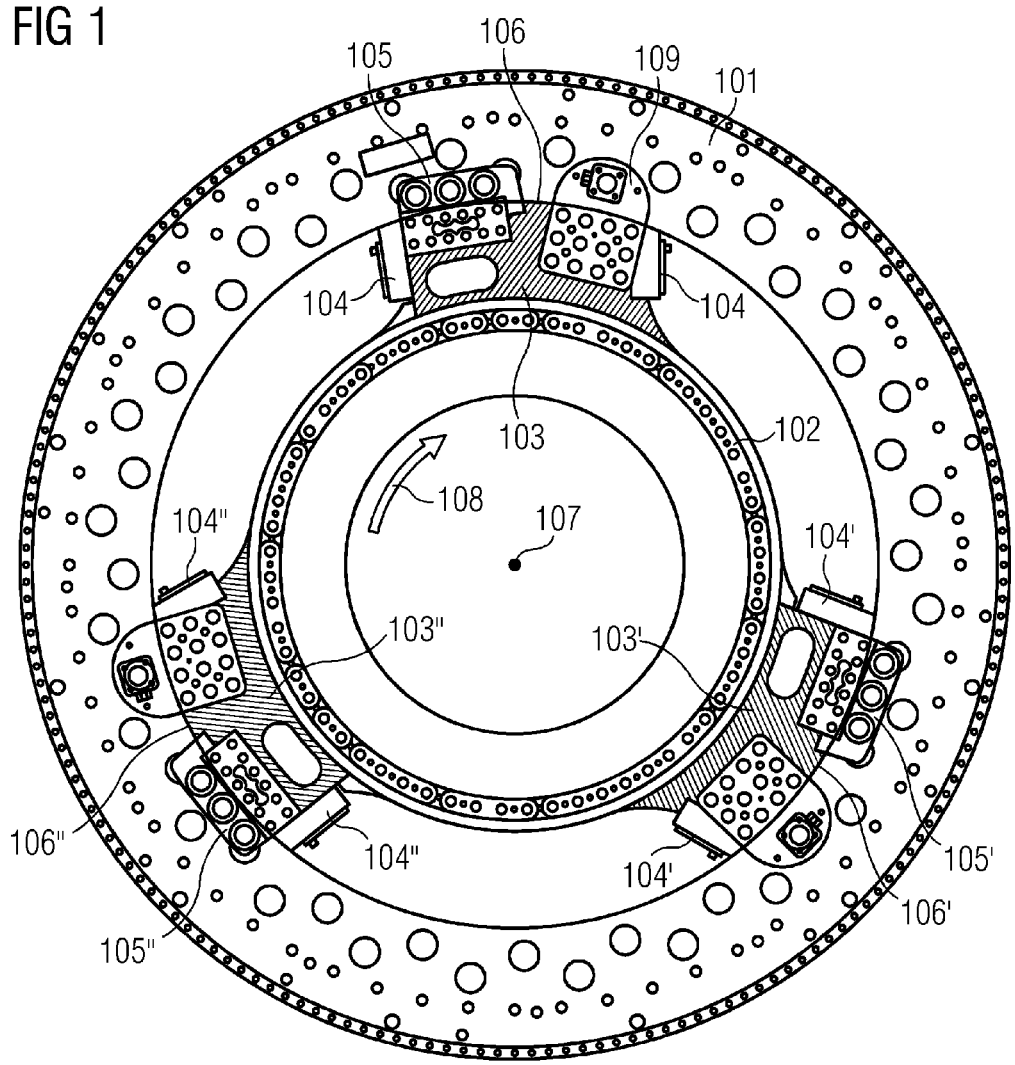
FIG. 1 shows a schematic view of a rotatable structure and a stationary structure of a wind turbine according to an exemplary embodiment of the present invention.

The illustrations in the drawings are schematic. It is noted that in different figures similar or identical elements are provided with the same reference signs.

FIG. 1 shows a wind turbine comprising a rotatable structure and a stationary structure. In particular, a brake disc 101 of the rotatable structure is shown. To the rotatable structure, a hub with blades is coupled. Furthermore, the stator frame 102 of the stationary structure is shown. The rotatable structure is rotatably coupled to the stationary structure. The stator frame 102 comprises one or a plurality of brake mounting sections 103, 103', 103" to which a respective brake 105, 105', 105" is mountable such that the brake disc 101 is breakable by the respectively mounted brake 105, 105', 105".

Furthermore, to some or all of the brake mounting sections 103, 103', 103", one or more respective safety bearing elements 104, 104', 104" are mountable. As shown in the exemplary embodiment in FIG. 1, two safety bearing elements 104, 104', 104" are mounted to each brake mounting section 103, 103', 103". Between the brake mounting section 103, 103', 103" and the brake disc 101, a gap 106, 106', 106" exists under a normal operation of the wind turbine. If wind gusts, large turbulences and/or if a bearing of the generator is damaged, the distance (gap 106, 106', 106") between the brake mounting section 103, 103', 103" may be reduced below a predetermined reference value. If the predetermined reference value is reached, the safety bearing element 104, 104', 104" contacts slidably the brake disc 101 such that a sliding bearing is generated and the rotatable structure may further rotate with respect to the stationary structure.

The stator frame 102 may comprise a circular profile which comprises a centre axis 107. The brake disc 101 may comprise a circular ring shape which comprises a rotational axis which is coaxial with the centre axis 107 of the stator frame 102.

Each brake mounting section 103, 103', 103" comprises a respective brake 105, 105', 105" which partially encloses the brake disc 101. Furthermore, a rotatable structure locking device 109 may be additionally attached to the brake mounting section 103, 103', 103". The rotatable structure locking device 109 is adapted for locking the rotatable structure to the stationary structure such that a rotation between the rotatable structure and the stationary structure is prevented if the wind turbine is in a non-operating state.

The brake mounting section 103, 103', 103" of the stator frame 102 are spaced apart from each other along a circumferential direction 108.

Figure 2:
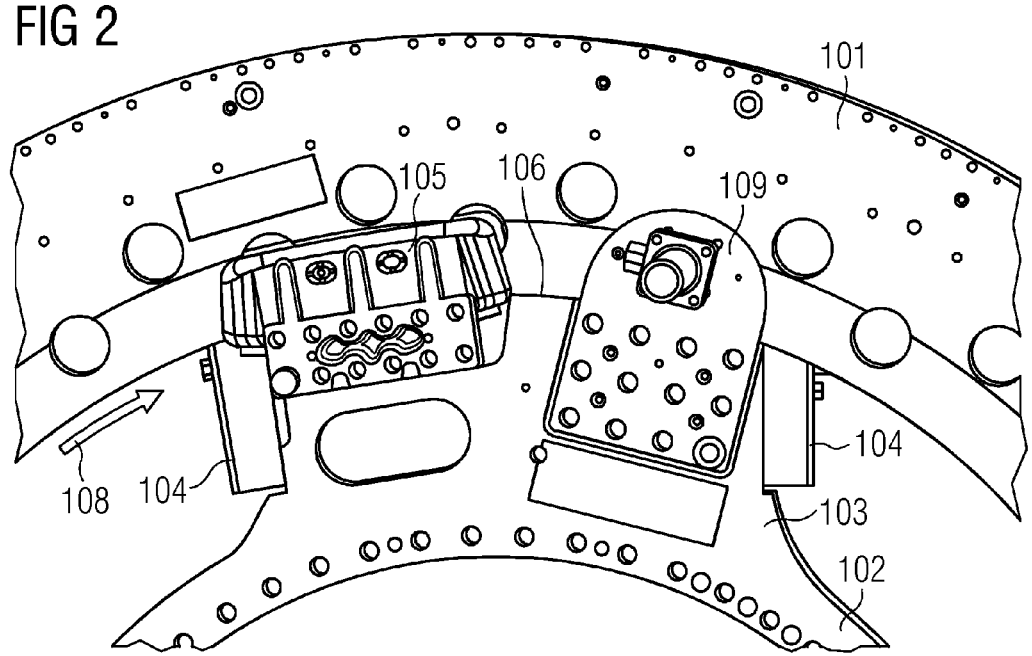
FIG. 2 shows an enlarged view of the brake mounting section and the brake disc as shown in the exemplary embodiment of FIG. 1.

FIG. 2 shows an enlarged view of the exemplary embodiment shown in FIG. 1. In particular, in FIG. 2, the brake mounting section 103, 103', 103" is shown. Along the circumferential direction 108, two respective safety bearing elements 104 are mounted to each opposed circumferential ends of the brake mounting section 103. Furthermore, the gap 106 is indicated which is located between a radially outer end surface of the brake mounting section 103 and a radially inner end surface of the brake disc 101.

The stator frame 102 may be a bed frame which is mounted to a tower top end of the wind turbine or to other wind turbine structural parts, for example.

Figure 3:
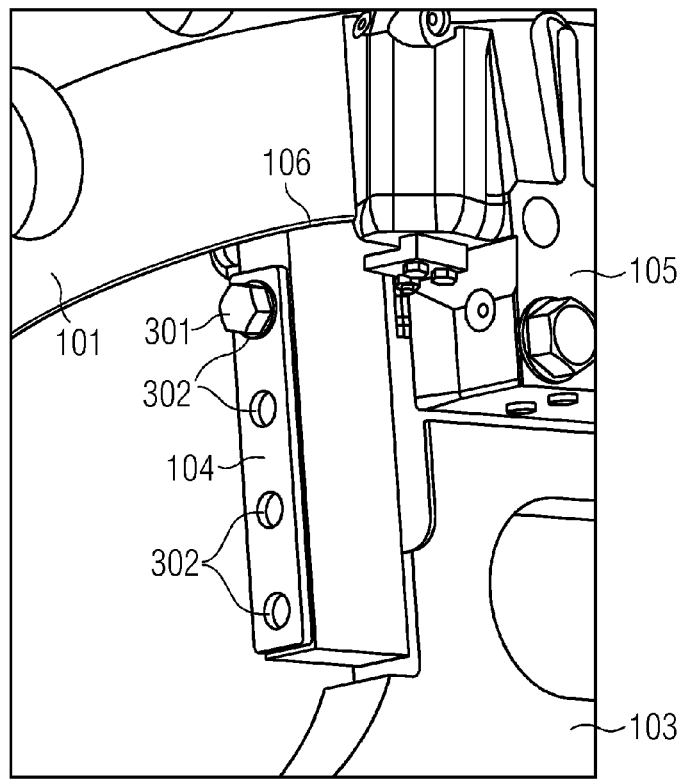
FIG. 3 and FIG. 4 show further enlarged views of the mounting section and the brake disc as shown in FIG. 2.
Figure 4:
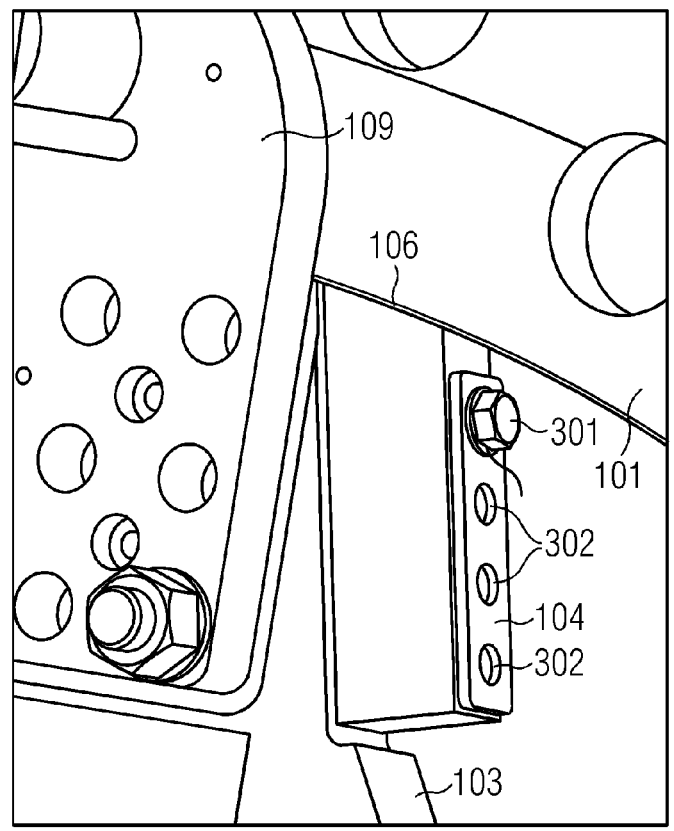

FIG. 3 and FIG. 4 show further enlarged views of the safety bearing elements 104 which are mounted to the brake mounting section 103.

FIG. 3 shows an enlarged view of the safety bearing element 104 which is shown on the left side with respect to the brake mounting section 103 shown in FIG. 2. The safety bearing element 104 comprises a radially outer contact surface which may slidably contact the inner contact surface of the brake disc 101 if the gap 106 reduces its width below a predetermined reference value. The safety bearing element 104 may comprise a plurality of boreholes 302 to which respective fixing elements 301, such as screws, may be put and detachably fixed to the brake mounting section 103. Furthermore, by the plurality of boreholes 302, a proper alignment of the safety bearing element 104 with respect to the brake disc 101 may be achieved.

FIG. 4 shows an enlarged view of the safety bearing element 104 which is shown on the circumferential right end side of the brake mounting section 103 shown in FIG. 2. The safety bearing element 104 comprises as described above a plurality of boreholes 302 into which detachable fixing elements 301 may be mounted.

Figure 5:
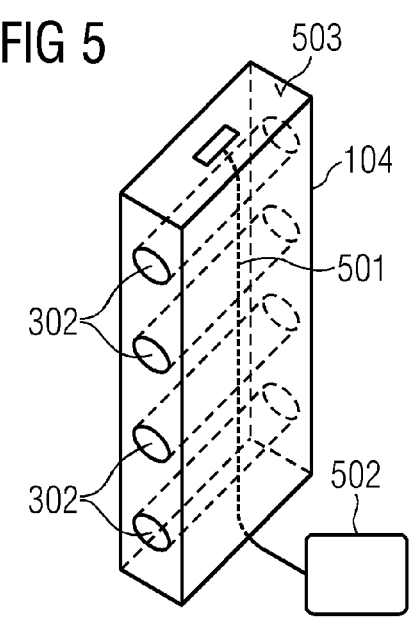
FIG. 5 shows a view of an exemplary embodiment of the safety bearing element according to an exemplary embodiment of the present invention.

FIG. 5 shows a schematic view of a safety bearing element 104 as shown in the figures above. The safety bearing element 104 comprises an indicating device 501, such as a wire 501 or a sensor. The wire 501 may be milled into the body of the safety bearing element 104. Furthermore, the wire 501 exits the safety bearing element 104 in the region of a radially outer contact surface 503 of the safety bearing element 104. Hence, if the wire 501 contacts the brake disc 101, a signal is generated which may be sent to a control unit of wind turbine 502. Hence, by the wire 501 a contact control between the safety bearing element 104 and the brake disc 101 may be achieved.

Furthermore, the wire 501 may be formed inside the safety bearing element 104, such that the wire 501 does initially not exit the contact surface 503. If abrasion occurs and the material of the safety bearing element 104 abrade until the wire 501 is laid open in the region of the radially outer contact surface 503, a contact signal is generated. This contact signal indicates a certain state of abrasion such that an abrasion control of the safety bearing element 104 is provided.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A wind turbine, comprising
a rotatable structure being coupled to a hub of the wind turbine and to a generator rotor comprising a circular shaped stiffening disc,
a stationary structure being coupled to a generator stator and comprising a stator frame, the stator frame having a circular profile, wherein the rotatable structure is rotatably coupled to the stationary structure such that the stiffening disc and the stator frame share a center axis,
and
a safety bearing element disposed a radial distance from the center axis, the radial distance of the safety bearing element being between the radial distance of the stator frame and the radial distance of the stiffening disc, wherein the safety bearing element is mounted to a brake mounting section on the stator frame such that the stiffening disc is in slidable contact with the safety bearing element if a distance between the stator frame and the stiffening disc is reduced below a predetermined reference value, wherein the stiffening disc is a brake disc, wherein a calliper brake is mountable to the brake mounting section, at a separate location from the safety bearing element, such that the brake disc is breakable by the mounted calliper brake, wherein the safety bearing element is mounted to the brake mounting section such that the brake disc is in slidable contact with the safety bearing element if the distance between the brake mounting section and the brake disc is reduced below a predetermined reference value, and wherein the safety bearing element is mounted to the brake mounting section such that a contact surface of the safety bearing element that is radially outward with respect to the center axis is in slidable contact with a surface of the brake disc that is radially inward with respect to the center axis if the distance between the brake mounting section and the brake disc is reduced below the predetermined reference value.

2. The wind turbine according to claim 1, wherein the brake disc surrounds the stator frame of the stationary structure.

3. The wind turbine according to claim 1, wherein the safety bearing element comprises an indicating device, wherein the indicating device indicates if the stiffening disc is in slidable contact with the safety bearing element.

4. The wind turbine according to claim 1, wherein the safety bearing element is mounted to the stator frame, in a detachable manner.

5. The wind turbine according to claim 1, wherein the safety bearing element is formed of a material which is softer than a material of the stiffening disc material.

6. The wind turbine according to claim 1, further comprising: a further safety bearing element, wherein the stator frame comprises a further brake mounting section to which a further calliper brake is mountable such that the brake disc is breakable by the mounted further calliper brake, wherein the brake mounting section and the further brake mounting section are spaced apart from each other along a circumferential direction of stator frame, wherein the further safety bearing element is mounted to the further brake mounting section such that the brake disc is in slidable contact with the safety bearing element if a further distance between the further mounting section and the brake disc is reduced below a further predetermined reference value.

7. The wind turbine according to claim 1, further comprising:
the calliper brake which is mounted to the brake mounting section.

8. The wind turbine according to claim 1, further comprising
a rotor locking device which is mounted to the brake mounting section,
wherein the rotor locking device is selectively fixable to the brake disc for locking the rotatable structure.

9. A wind turbine, comprising
a rotatable structure being coupled to a hub of the wind turbine and to a generator rotor comprising a stiffening disc,
a stationary structure being coupled to a generator stator and comprising a stator frame, wherein the rotatable structure is rotatably coupled to the stationary structure, and
a safety bearing element, wherein the safety bearing element is mounted to a brake mounting section on the stator frame such that the stiffening disc is in slidable contact with the safety bearing element if a distance between the stator frame and the stiffening disc is reduced below a predetermined reference value, wherein the safety bearing element includes a wire formed inside as an indicating element, whereby upon abrasion, when the wire is exposed and contacts the stiffening disc for current to flow therethrough, a signal is generated.

10. The wind turbine according to claim 9, wherein the stiffening disc surrounds the stator frame of the stationary structure.

11. The wind turbine according to claim 9, wherein the safety bearing element is mounted to the stator frame, in a detachable manner.

12. The wind turbine according to claim 9, wherein the safety bearing element is formed of a material which is softer than a material of the stiffening disc material.

13. The wind turbine according to claim 9, further comprising:
a calliper brake which is mounted to the brake mounting section.

14. The wind turbine according to claim 9, further comprising
a rotor locking device which is mounted to the brake mounting section,
wherein the rotor locking device is selectively fixable to the stiffening disc for locking the rotatable structure.

* * * * *